(12) United States Patent
Misra et al.

(10) Patent No.: US 12,346,825 B2
(45) Date of Patent: Jul. 1, 2025

(54) UTILIZING NATURAL LANGUAGE PROCESSING SIMILARITY MATCHING TO DETERMINE WHETHER A PROBLEM REQUIRES QUANTUM COMPUTING OR CLASSICAL COMPUTING

(71) Applicant: Accenture Global Solutions Limited, Dublin (IE)

(72) Inventors: Janardan Misra, Karnataka (IN); Vikrant S. Kaulgud, Pune (IN); Sanjay Podder, Thane (IN); Rupesh Kaslay, Maharashtra (IN)

(73) Assignee: Accenture Global Solutions Limited, Dublin (IE)

( * ) Notice: Subject to any disclaimer, the term of this patent is extended or adjusted under 35 U.S.C. 154(b) by 1069 days.

(21) Appl. No.: 17/107,357

(22) Filed: Nov. 30, 2020

(65) Prior Publication Data
US 2021/0224679 A1    Jul. 22, 2021

(30) Foreign Application Priority Data

Jan. 22, 2020   (IN) .............................. 202041002840
May 21, 2020   (IN) .............................. 202041021399

(51) Int. Cl.
| | |
|---|---|
| *G06N 5/02* | (2023.01) |
| *G06F 18/21* | (2023.01) |
| *G06F 18/22* | (2023.01) |
| *G06F 40/289* | (2020.01) |
| *G06F 40/30* | (2020.01) |

(Continued)

(52) U.S. Cl.
CPC ............. *G06N 5/02* (2013.01); *G06F 18/217* (2023.01); *G06F 18/22* (2023.01); *G06F 40/289* (2020.01); *G06F 40/30* (2020.01); *G06N 5/04* (2013.01); *G06N 10/80* (2022.01)

(58) Field of Classification Search
CPC .............................. G06F 40/30; G06F 40/289
See application file for complete search history.

(56) References Cited

U.S. PATENT DOCUMENTS

| | | | |
|---|---|---|---|
| 11,095,943 B1 * | 8/2021 | Kissig | ...................... G06N 3/02 |
| 2002/0054089 A1 * | 5/2002 | Nicholas | ................ G06Q 30/02 715/745 |

(Continued)

*Primary Examiner* — Daniel C Washburn
*Assistant Examiner* — Paul J. Mueller
(74) *Attorney, Agent, or Firm* — Polsinelli PC

(57) ABSTRACT

In some implementations, an advisor system may receive a description of a problem to be solved and problem data identifying quantum computing-related and classical computing-related problems. The advisor system may perform natural language processing on the description of the problem and the problem data to respectively generate a problem embedding vector for the problem and to generate embedding vectors that represent the quantum computing-related and classical computing-related problems. The advisor system may process the problem embedding vector and the embedding vectors, with a vector matching model, to determine a semantically closest matching one of the embedding vectors to the problem embedding vector and, accordingly, may generate a recommendation that includes an indication to solve the problem with a classical computing resource, a quantum computing resource, or a combination of a classical computing resource and a quantum computing resource.

20 Claims, 10 Drawing Sheets

(51) Int. Cl.
*G06N 5/04* (2023.01)
*G06N 10/80* (2022.01)

(56) References Cited

U.S. PATENT DOCUMENTS

| | | | |
|---|---|---|---|
| 2017/0357539 A1* | 12/2017 | Dadashikelayeh | G06N 10/80 |
| 2018/0091440 A1* | 3/2018 | Dadashikelayeh | H04L 63/20 |
| 2019/0258952 A1* | 8/2019 | Denchev | G06Q 10/00 |
| 2020/0082806 A1* | 3/2020 | Kim | G10L 25/30 |
| 2020/0311207 A1* | 10/2020 | Kim | G06F 40/131 |
| 2021/0103634 A1* | 4/2021 | Gkikas | G06F 40/211 |
| 2021/0120035 A1* | 4/2021 | Onut | H04L 63/1483 |
| 2021/0216577 A1* | 7/2021 | Xiao | G06F 16/3329 |

* cited by examiner

UTILIZING NATURAL LANGUAGE PROCESSING SIMILARITY MATCHING TO DETERMINE WHETHER A PROBLEM REQUIRES QUANTUM COMPUTING OR CLASSICAL COMPUTING

CROSS-REFERENCE TO RELATED APPLICATIONS

This Patent Application claims priority to Indian Provisional Patent Application Nos. 202041002840 and 202041021399, filed on Jan. 22, 2020 and May 21, 2020, respectively, and both entitled "UTILIZING NATURAL LANGUAGE PROCESSING SIMILARITY MATCHING TO DETERMINE WHETHER A PROBLEM REQUIRES QUANTUM COMPUTING OR CLASSICAL COMPUTING." The disclosures of the prior Applications are considered part of and are incorporated by reference into this Patent Application.

BACKGROUND

As the promise of quantum computing advancing from theory to practice is becoming a reality, entities (e.g., companies, agencies, institutions, and/or the like) have started looking forward to adoption of quantum computing in application architecture and development lifecycles.

SUMMARY

In some implementations, a method includes receiving, by a device, a description of a problem to be solved; receiving, by the device, problem data identifying quantum computing-related and classical computing-related problems; performing, by the device, natural language processing on the description of the problem to generate a problem embedding vector for the problem; performing, by the device, natural language processing on the problem data to generate embedding vectors that represent the quantum computing-related and classical computing-related problems included in the problem data; processing, by the device, the problem embedding vector and the embedding vectors, with a vector matching model, to determine a semantically closest matching one of the embedding vectors to the problem embedding vector; generating, by the device, a recommendation based on the semantically closest matching one of the embedding vectors to the problem embedding vector, wherein the recommendation includes an indication to one of: solve the problem with a classical computing resource, solve the problem with a quantum computing resource, or solve the problem with a combination of a classical computing resource and a quantum computing resource; and performing, by the device, one or more actions based on the recommendation.

In some implementations, a device includes one or more memories; and one or more processors, communicatively coupled to the one or more memories, configured to: provide, to a client device, one or more questions associated with a problem to be solved; receive, from the client device, one or more answers to the one or more questions; determine a description of the problem based on the one or more answers; receive problem data identifying quantum computing-related and classical computing-related problems; perform natural language processing on the description of the problem to generate a problem embedding vector for the problem; perform natural language processing on the problem data to generate embedding vectors that represent the quantum computing-related and classical computing-related problems included in the problem data; process the problem embedding vector and the embedding vectors, with a vector matching model, to determine a semantically closest matching one of the embedding vectors to the problem embedding vector; generate a recommendation based on the semantically closest matching one of the embedding vectors to the problem embedding vector, wherein the recommendation includes an indication to one of: solve the problem with a classical computing resource, solve the problem with a quantum computing resource, or solve the problem with a combination of a classical computing resource and a quantum computing resource; and perform one or more actions based on the recommendation.

In some implementations, a non-transitory computer-readable medium storing a set of instructions includes one or more instructions that, when executed by one or more processors of a device, cause the device to: receive a description of a problem to be solved; receive problem data identifying quantum computing-related and classical computing-related problems; extract terms from the description of the problem; determine term embeddings for the terms; apply weights to the term embeddings to generate weighted term embeddings; and calculate an average of the weighted term embeddings as a problem embedding vector for the problem; perform natural language processing on the problem data to generate embedding vectors that represent the quantum computing-related and classical computing-related problems included in the problem data; process the problem embedding vector and the embedding vectors, with a vector matching model, to determine a semantically closest matching one of the embedding vectors to the problem embedding vector; generate a recommendation based on the semantically closest matching one of the embedding vectors to the problem embedding vector, wherein the recommendation includes an indication to one of: solve the problem with a classical computing resource, solve the problem with a quantum computing resource, or solve the problem with a combination of a classical computing resource and a quantum computing resource; and perform one or more actions based on the recommendation.

DETAILED DESCRIPTION

Figure 1A:
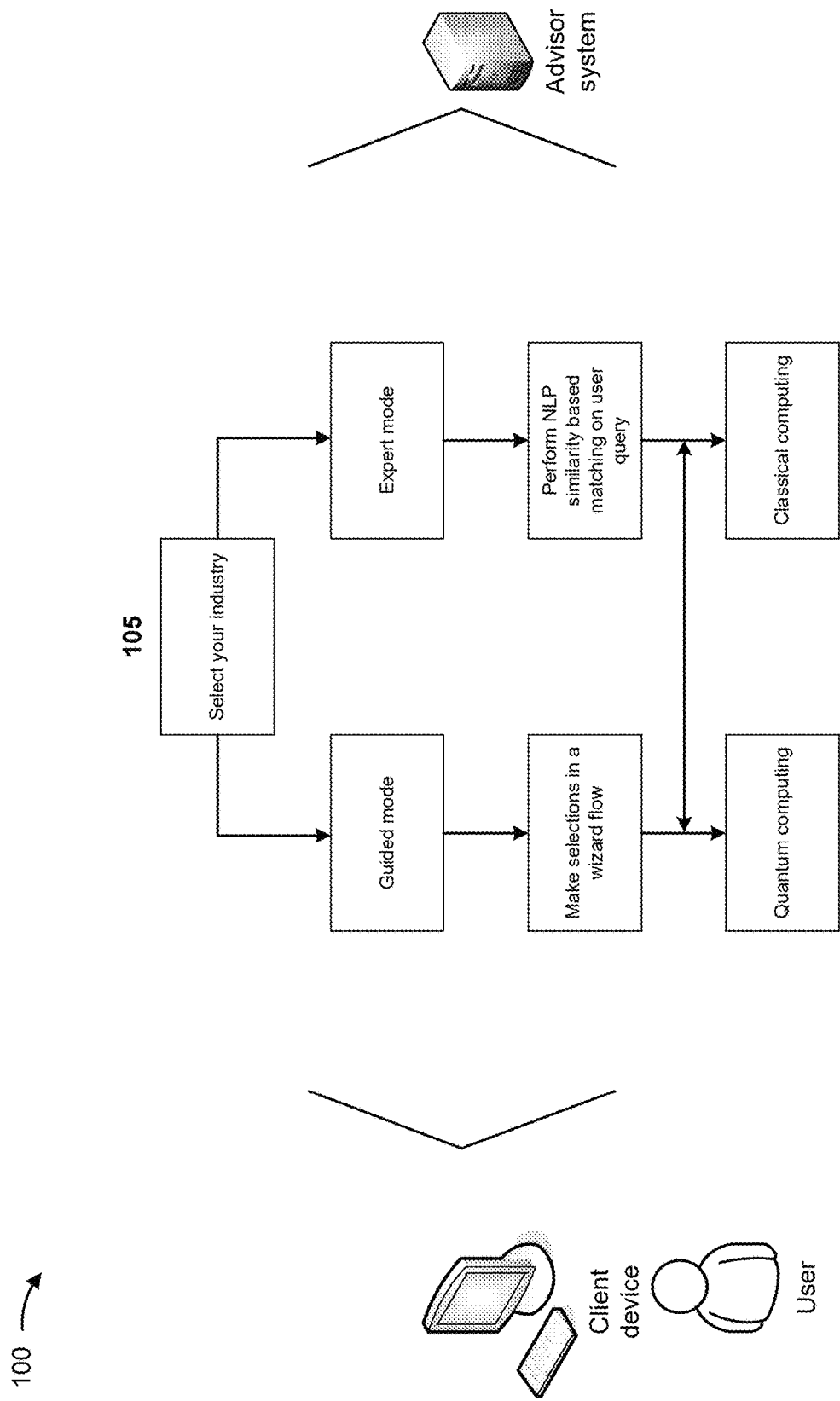
FIGS. 1A-1G are diagrams of an example implementation described herein.

The following detailed description of example implementations refers to the accompanying drawings. The same reference numbers in different drawings may identify the same or similar elements.

Limitations exist in current quantum computing solutions, and most quantum computing uses are limited to a specific set of low-level algorithmic challenges at a prototype level. Furthermore, developing quantum computing solutions is cost intensive since such solutions require skills and resources not typically acquired through traditional software development practices. Thus, an entity today is faced with a challenge of whether the entity will truly benefit from early investment in quantum computing or whether the entity should wait for quantum computing to become a commercially viable investment. Early investment in quantum computing may provide a business advantage, but may also create strategic uncertainties since it is not clear exactly how long the entity should wait before reliable and scalable quantum computers are ready for commercial application development. However, if the entity waits too long, the entity may lose the business advantage and may face possible cost escalations associated with utilizing quantum computing.

Therefore, when faced with a new problem that requires execution on computing devices, an entity needs to determine whether the problem is more suitably solved via quantum computing or via classical computing. Unfortunately, current techniques fail to provide such insight to the entity. Thus, current techniques waste computing resources (e.g., processing resources, memory resources, communication resources), networking resources, and/or the like associated with incorrectly determining that the problem is more suitably solved via quantum computing or via classical computing, utilizing expensive quantum computing for a problem that may be solved via cheaper classical computing, being unable to solve a problem with classical computing, and/or the like.

Some implementations described herein relate to an advisor system that utilizes natural language processing similarity matching to determine whether a problem requires quantum computing or classical computing. For example, the advisor system may receive a description of a problem to be solved and problem data identifying quantum computing-related and classical computing-related problems. The advisor system may perform natural language processing on the description of the problem and the problem data to respectively generate a problem embedding vector for the problem and to generate embedding vectors that represent the quantum computing-related and classical computing-related problems. The advisor system may process the problem embedding vector and the embedding vectors, with a vector matching model, to determine a semantically closest matching one of the embedding vectors to the problem embedding vector and, accordingly, may generate a recommendation that includes an indication to solve the problem with a classical computing resource, a quantum computing resource, or a combination of a classical computing resource and a quantum computing resource. The advisor system may perform one or more actions based on the recommendation, such as selecting a computing resource based on the recommendation and providing the description of the problem to the computing resource for execution.

In this way, the advisor system utilizes natural language processing similarity matching to determine whether a problem requires quantum computing or classical computing. The advisor system may begin at a particular level of applications to solve a problem and may gradually guide a user to a level where a quantum computing versus classical computing decision may be determined. In this way, the advisor system enables the user to make an informed decision about whether to solve a problem via quantum computing or via classical computing. This, in turn, conserves computing resources, networking resources, human resources, and/or the like that would otherwise have been wasted in incorrectly determining that the problem is more suitably solved via quantum computing or via classical computing, utilizing expensive quantum computing for a problem that may be solved via cheaper classical computing, being unable to solve a problem with classical computing, and/or the like.

FIGS. 1A-1G are diagrams of an example implementation 100 associated with utilizing natural language processing similarity matching to determine whether a problem requires quantum computing or classical computing. As shown in FIGS. 1A-1G, example implementation 100 includes a client device, a data source, and an advisor system. These devices are described in more detail below in connection with FIG. 2 and FIG. 3. The client device, the data source, and/or the advisor system may be connected via a network, such as a wired network (e.g., the Internet or another data network) and/or a wireless network (e.g., a wireless local area network, a wireless wide area network, a cellular network, and/or the like).

As shown in FIG. 1A, and reference number 105, the client device and the advisor system may enable a user of the client device (e.g., an application developer) to determine whether a problem to be solved is more suitably solved via quantum computing or via classical computing. In this regard, and as shown in FIG. 1A, the client device and the advisor system may provide two modes for guiding the user in making such a decision, a guided mode and an expert mode. The guided mode may be utilized by a user that understands functional objectives of the problem but is unfamiliar with deep technical details of the problem, such as underlying algorithmic objectives of the problem. The guided mode may include a wizard-driven flow and may be utilized by, for example, decision makers, functional analysts, technical analysts, and/or the like. The expert mode may be utilized by a more technically aware user that understands the underlying algorithmic objectives of the problem. The expert mode may include a search-driven flow (e.g., query searches based on use cases, industries, and/or the like) and may be utilized by, for example, technical analysts.

The guided mode may include a survey-like structured approach that captures the user's ideas better when a problem is not well-defined. The guided mode may provide a wizard interface that captures high-level business objectives, guides the user to low-level technical objectives, and informs the user whether quantum computing or classical computing should be used for the technical objectives.

For example, the guided mode may be utilized when a problem relates to financial services and only a generic business context is known to the user (e.g., when the user only has a general idea about the problem to solve for designing a business application). In this case, the advisor system may guide the user to make choices by navigating through a business process model in a question and answer mode. For example, assuming that the problem to be solved is related to portfolio optimization, the advisor system may guide the user to make appropriate choices using the following first sequence of dialog:

Please select your industry. User Selection: Financial Services;

Please select type of financial services. User Selection: Capital Markets;

Please select type of resources to be managed. User Selection: High Performance Asset Management (HPAM);

Please select type of assets your application is going to manage. User Selection: Portfolio/Fund Administration;

Is the application aimed to manage portfolio/funds or performance? User Selection: Performance & Attribution;

Is the application going to measure performance of funds or something else? User Selection: Performance Measurement of Funds;

Is key functionality aimed for input data set-up or calculations of reporting? User Selection: Input Data Setup;

Is input data related to portfolio construction? User Selection: Portfolio Construction;

Does portfolio construction involve analytics? User Selection: Portfolio analytics; and Does portfolio construction involve optimization? User Selection: Portfolio optimization.

In another example, if the user has knowledge of a specific problem to be solved (e.g., Portfolio Optimization), the advisor system may request that the user define problem scenarios for the problem, as shown below:

Problem Scenario 1: Investment Reallocation, Risk Management, Spectrum Analysis;

Problem Scenario 2: Say you can place a Future Value Score and a current cost of the stock. Find the best stocks to incorporate into a portfolio for a given price; and Problem Scenario 3: Account for the fact that different stocks are related to each other.

In some implementations, the guided mode may utilize the following high-level themes. A first theme may include information where problems listed under "general idea" are high-level objectives and problems listed under "specific problem" are low-level objectives. A second theme may include information where quantum problems listed under "general idea" are rephrased as quadratic unconstrained binary optimization (QUBO) problems, and a goal is to paraphrase each QUBO in different ways, that do not appear as duplicates, yet help the user to make a correct selection based upon background and experience of the user. Examples of such paraphrasing may include a quadrative assignment problem and a knapsack problem. The quadratic assignment problem may include a first paraphrase (e.g., given different locations, assign facilities to locations with the goal of minimizing the sum of the distances between facilities multiplied by the corresponding flows) and a second paraphrase (e.g., given a set of N locations, set up N factories at N locations such that factories with high flows between each other are placed close together). The knapsack problem may include a first paraphrase (e.g., find the best way to pack a set of items of given sizes into containers with fixed capacities) and a second paraphrase (e.g., find the best way to load boxes of varying sizes and weights onto delivery trucks efficiently).

A third theme may include information where quantum computing problems listed under a "specific problem" are taken from a known use-case repository. A fourth theme may include information where classical computing problems are mixed with both high-level and low-level quantum computing problems. Classical computing problems may be phrased in the same way as quantum computing problems so as to avoid unintentionally inducing the user to make a particular selection (e.g., associated with either quantum problems or classical computing problems).

The expert mode may include a search engine approach that allows the user to input a query that includes a description of the problem using technical terms that are similar to terms associated with known quantum computing problems and known classical computing problems. The expert mode may perform natural language processing similarity-based matching on the query to identify a quantum computing problem or a classical computing problem that is similar to the query and informs the user whether quantum computing or classical computing should be used.

Figure 1B:
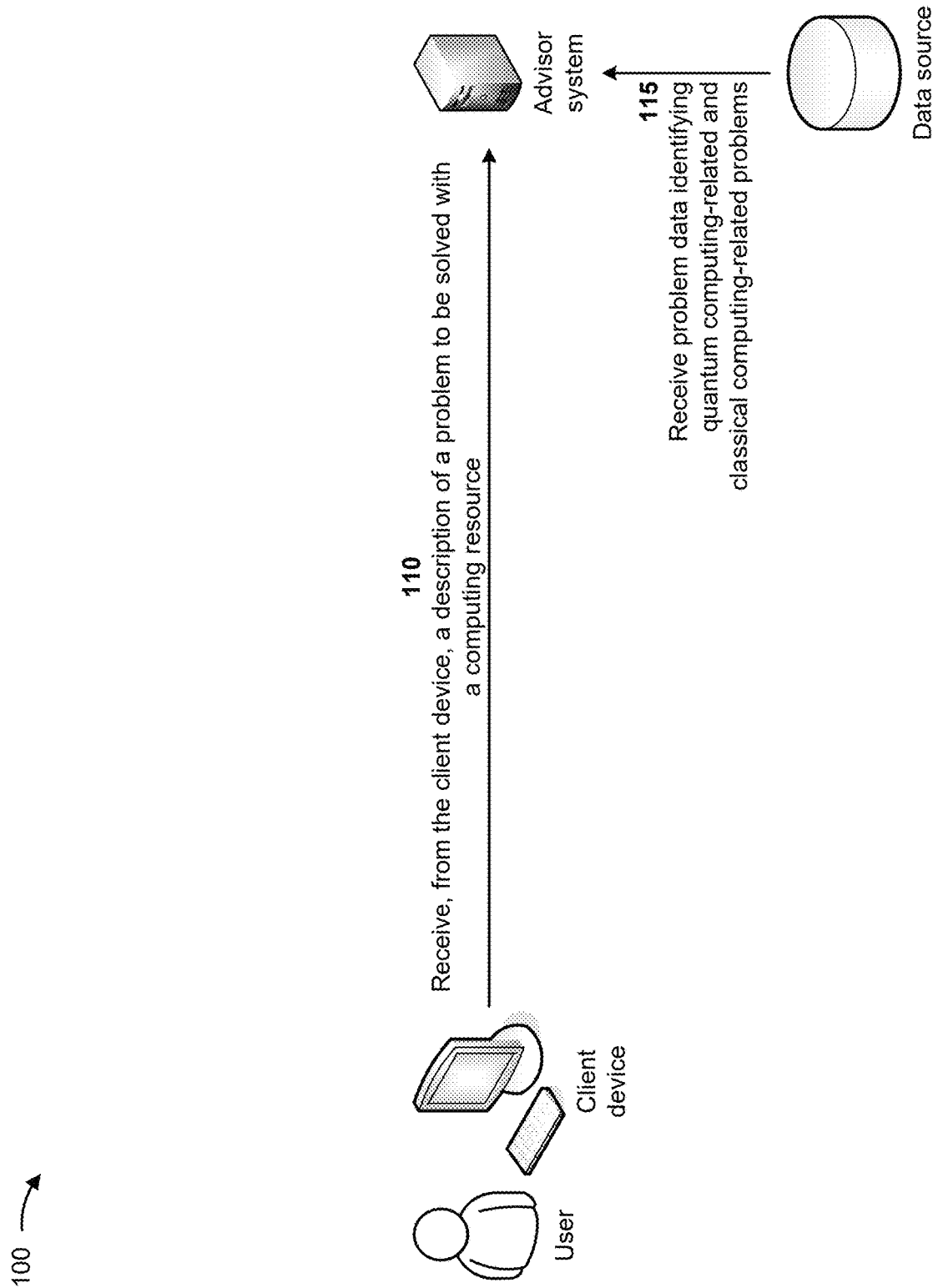

Turning to FIG. 1B, and reference number 110, the advisor system may receive a description of a problem to be solved with a computing resource. For example, the problem may warrant creation of an application (e.g., that solves the problem) that is to be run using a classical computing resource and/or a quantum computing resource. The advisor system may receive the description of the problem from the client device (e.g., via the network that connects the client device and the advisor system).

In some implementations, the advisor system may provide (e.g., via the guided mode described above in relation to FIG. 1A and reference number 105) one or more questions associated with the problem to the client device. The advisor system may receive, from the client device, one or more answers to the one or more questions and may determine the description of the problem based on the one or more answers (e.g., by concatenating the one or more questions and the one or more answers). Additionally, or alternatively, the advisor system may receive (e.g., via the expert mode described above in relation to FIG. 1A and reference number 105) the description of the problem to be solved as a user query from the client device.

As further shown in FIG. 1B, and by reference number 115, the advisor system may receive problem data identifying quantum computing-related and/or classical computing-related problems. For example, the problem data may include data identifying previously identified quantum computing use-cases or problems; QUBO problems; graph problems; and/or problems related to simulation of physical systems, cryptographic applications, and/or machine learning optimization, among other examples, that may be solved using a quantum computing resource. As another example, the problem data may include data identifying previously identified classical computing use-cases or problems, such as problems that can be solved using a classical computing resource in polynomial time. In some implementations, the problem data may include data identifying use-cases or problems that can be solved using a combination of a quantum computing resource and a classic computing resource. The advisor system may receive the description of the problem from the data source (e.g., via the network that connects the data source and the advisor system).

Figure 1C:
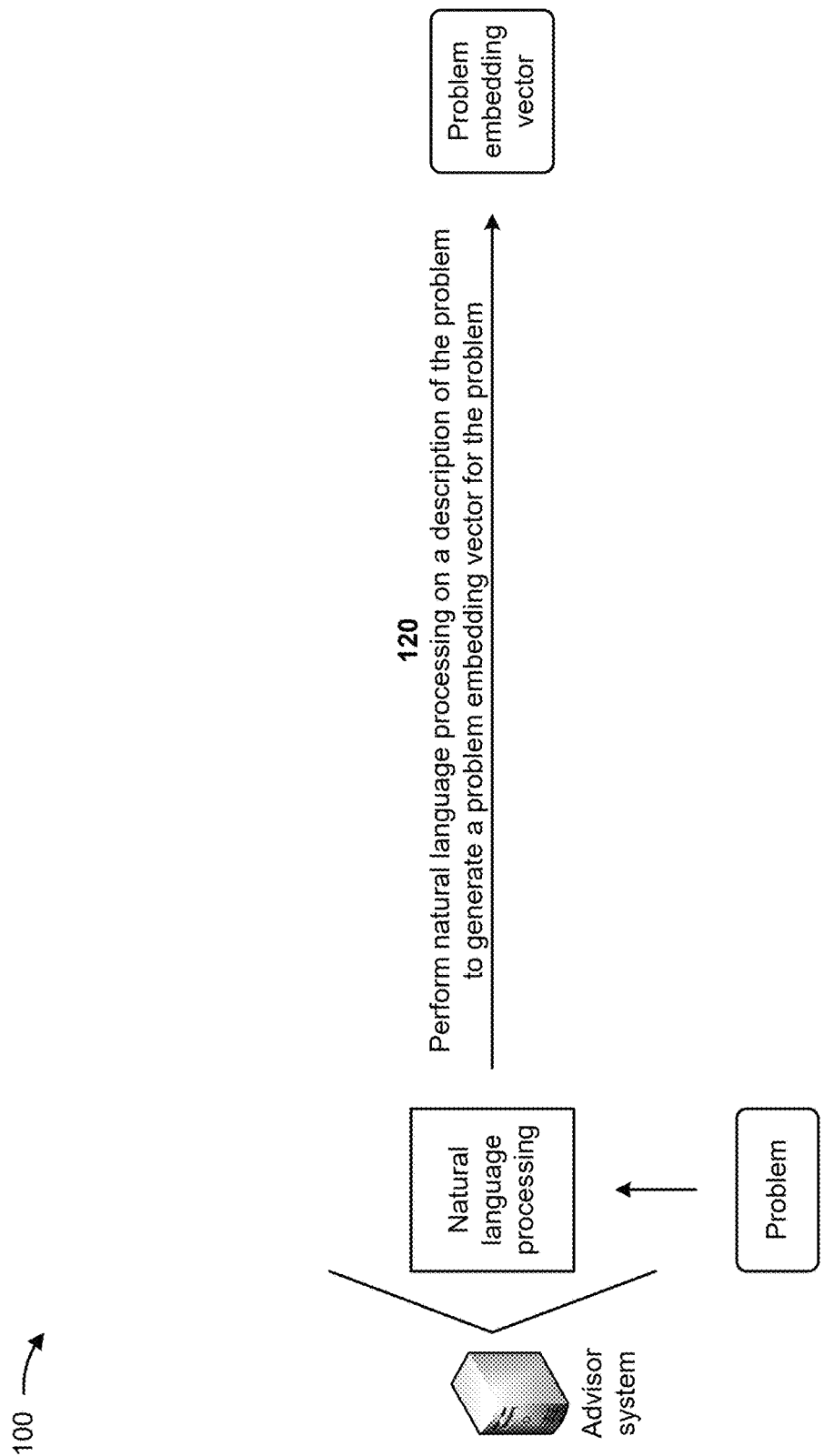

Turning to FIG. 1C, and reference number 120, the advisor system may perform natural language processing on the description of the problem to generate a problem embedding vector for the problem. The problem embedding vector may include, for example, a neural text embedding vector (e.g., a Glove vector). In some implementations, when performing the natural language processing on the description of the problem, the advisor system may extract terms from the description of the problem, may determine term embeddings for the terms, may apply weights to the term embeddings to generate weighted term embeddings, and may calculate an average of the weighted term embeddings as the problem embedding vector. For example, the advisor system may generate the problem embedding vector for the problem according to the following equation: $em(problem_{desc}) = 1/s \Sigma_{x \in problem} \alpha(x) * em(x)$, where $em(problem_{desc})$ represents the problem embedding vector, s represents the number of terms in the problem, x represents a term of the problem, $\alpha(x)$ represents a weight associated with the term x, and $em(x)$ represents a term embedding for the term x. In some implementations, when performing the natural language processing on the description of the problem, the advisor system may convert the description of the problem into a machine-readable text, split the machine-readable text into an array of words, split the array of words into sequences of contiguous words, and calculate word scores for the sequences of contiguous words to generate the problem embedding vector.

In some implementations, the advisor system may perform at least a portion of the natural language processing using a machine learning model. In this case, the advisor system may train the machine learning model with historical data (e.g., historical descriptions of problems) to enable the machine learning model to generate a problem embedding vector for the problem, as described herein. In some implementations, the advisor system may separate the historical data into a training set, a validation set, a test set, and/or the like. The training set may be utilized to train the machine learning model. The validation set may be utilized to validate results of the trained machine learning model. The test set may be utilized to test operation of the machine learning model.

In some implementations, the advisor system may train the machine learning model using, for example, an unsupervised training procedure and based on the historical data. For example, the advisor system may perform dimensionality reduction to reduce the historical data to a minimum feature set, thereby reducing resources (e.g., processing resources, memory resources, and/or the like) to train the machine learning model, and the advisor system may apply a classification technique to the minimum feature set.

In some implementations, the advisor system may use a logistic regression classification technique to determine a categorical outcome (e.g., problem embedding vectors). Additionally, or alternatively, the advisor system may use a naïve Bayesian classifier technique. In this case, the advisor system may perform binary recursive partitioning to split the historical data into partitions and/or branches and use the partitions and/or branches to determine outcomes (e.g., problem embedding vectors). Based on using recursive partitioning, the advisor system may reduce utilization of computing resources relative to manual, linear sorting and analysis of data points, thereby enabling use of thousands, millions, or billions of data points to train the machine learning model, which may result in a more accurate model than using fewer data points.

Additionally, or alternatively, the advisor system may use a support vector machine (SVM) classifier technique to generate a non-linear boundary between data points in the training set. In this case, the non-linear boundary is used to classify test data into a particular class.

Additionally, or alternatively, the advisor system may train the machine learning model using a supervised training procedure that includes receiving input to the machine learning model from a subject matter expert, which may reduce an amount of time, an amount of processing resources, and/or the like to train the machine learning model relative to an unsupervised training procedure. In some implementations, the advisor system may use one or more other model training techniques, such as a neural network technique, a latent semantic indexing technique, and/or the like. For example, the advisor system may perform an artificial neural network processing technique (e.g., using a two-layer feedforward neural network architecture, a three-layer feedforward neural network architecture, and/or the like) to perform pattern recognition with regard to patterns of the historical data. In this case, using the artificial neural network processing technique may improve an accuracy of the trained machine learning model generated by the advisor system by being more robust to noisy, imprecise, or incomplete data, and by enabling the advisor system to detect patterns and/or trends undetectable to human analysts or systems using less complex techniques.

In some implementations, rather than training the machine learning model, the advisor system may receive a trained machine learning model from another device. For example, the other device may generate the machine learning model based on having trained the machine learning model in a manner similar to that described above, and may provide the trained machine learning model to the advisor system (e.g., may pre-load the advisor system with the machine learning model, may receive a request from the advisor system for the trained machine learning model, and/or the like).

Figure 1D:
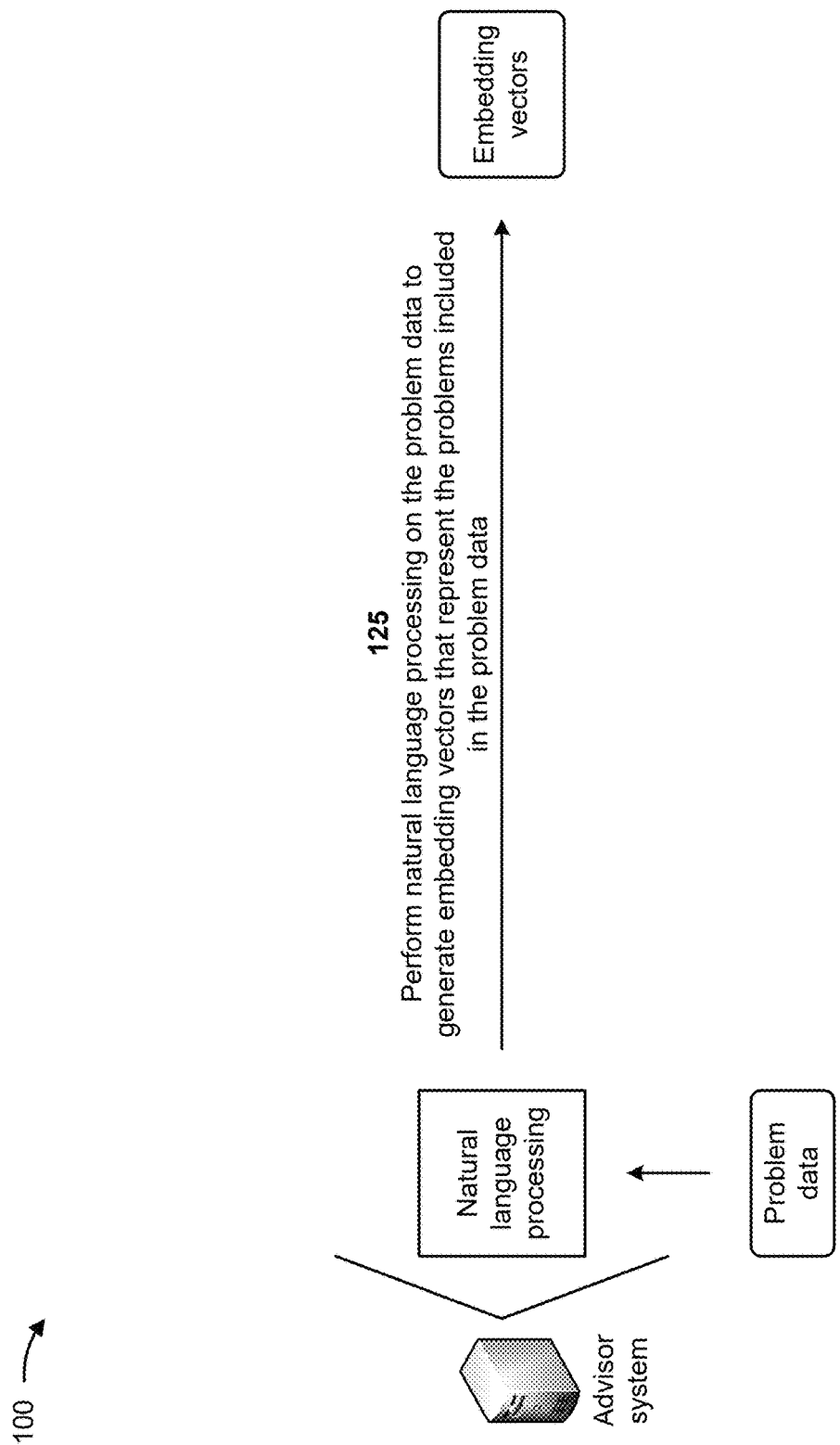

Turning to FIG. 1D, and reference number 125, the advisor system may perform natural language processing on the problem data to generate embedding vectors that represent the quantum computing-related and classical computing-related problems included in the problem data. An embedding vector that represents a quantum computing-related problem or classical computing-related problem may include, for example, a neural text embedding vector (e.g., a Glove vector). In some implementations, when performing the natural language processing on the problem data, the advisor system may extract terms from the problem data, may determine term embeddings for the terms, may apply weights to the term embeddings to generate weighted term embeddings, and may calculate averages of the weighted term embeddings as the embedding vectors (e.g., in a similar manner as that described above in relation to FIG. 1C and reference number 120). In some implementations, when performing the natural language processing on the problem data, the advisor system may convert the problem data into a machine-readable text, may split the machine-readable text into an array of words, may split the array of words into sequences of contiguous words, and may calculate word scores for the sequences of contiguous words to generate the embedding vectors.

In some implementations, the advisor system may train a machine learning model to generate the embedding vectors from the problem data. For example, the advisor system may train the machine learning model in a manner similar to the machine learning model described above in connection with FIG. 1C and reference number 120. In some implementations, rather than training the machine learning model, the advisor system may obtain the machine learning model from another system or device that trained the machine learning model. In this case, the advisor system may provide the other system or device with historical data for use in training the machine learning model, and the advisor system may provide the other system or device with updated historical data to retrain the machine learning model in order to update the machine learning model.

Figure 1E:
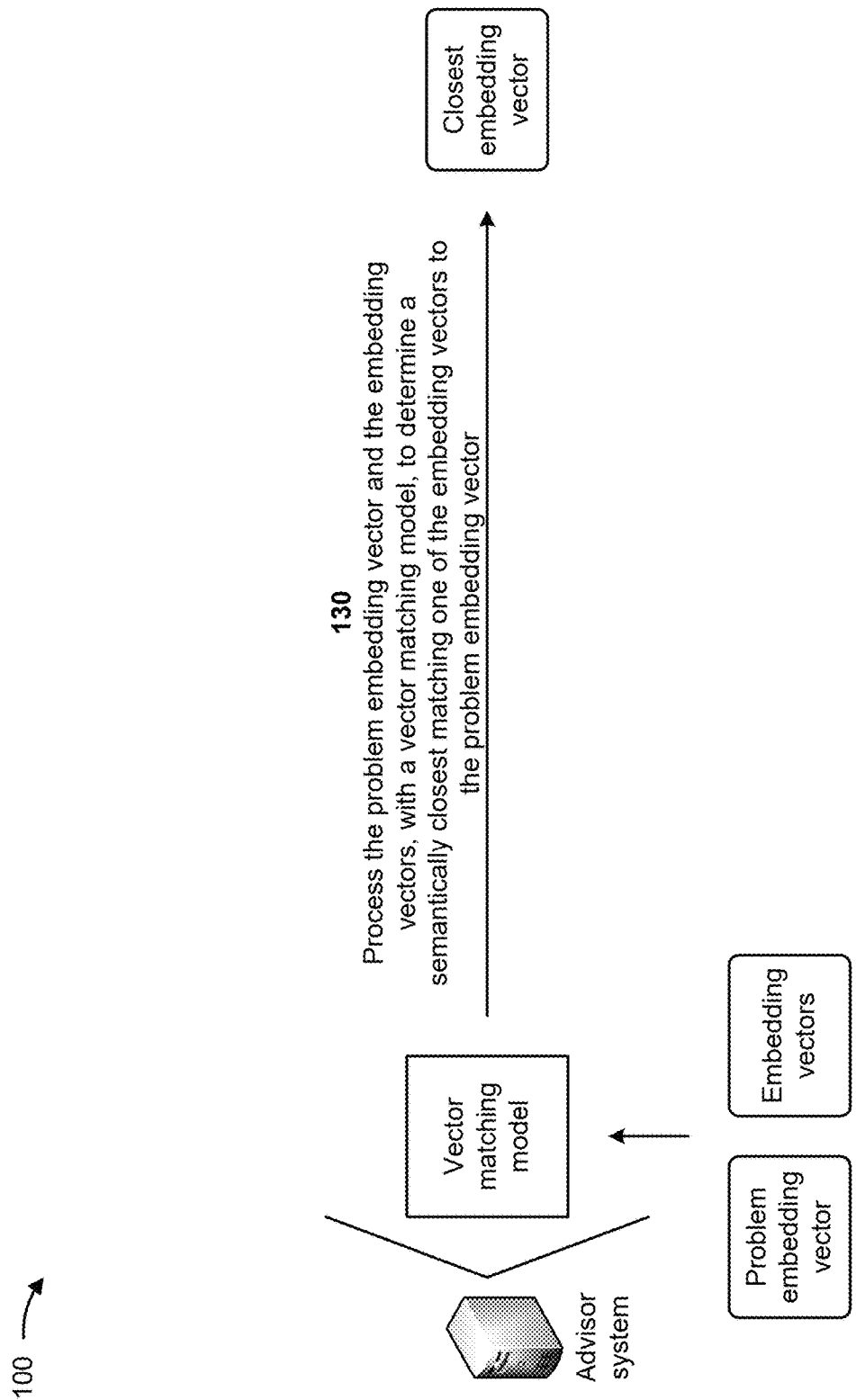

Turning to FIG. 1E, and reference number 130, the advisor system may process the problem embedding vector and the embedding vectors, with a vector matching model, to determine a semantically closest matching one of the embedding vectors to the problem embedding vector. The vector matching model may include, for example, a cosine similarity model. For example, the advisor system may determine the semantically closest matching one of the embedding vectors to the problem embedding vector according to the following equation:

$$\text{math}(em(\text{problem}_{desc}), em(\text{problem}_{data})) =$$

$$\begin{cases} \max_{\forall p \in \text{problem}_{data}} \text{cosine}(em(\text{problem}_{desc}), em(p)) \geq \delta \\ \phi \qquad \qquad \qquad \qquad \qquad \qquad \qquad \text{otherwise} \end{cases},$$

where $em(\text{problem}_{desc})$ represents the problem embedding vector, $em(\text{problem}_{data})$ represents the embedding vectors that represent the problems included in the problem data, p represents a problem included in the problem data, $em(p)$ represents the embedding vector that represents the problem p, and δ represents a threshold of similarity (e.g., where $0 \leq \delta \leq 1$), such that only embedding vectors with a similarity to the problem embedding vectors that satisfies (e.g., is greater than or equal to) δ are considered by the advisor system. The advisor system may select the embedding vector associated with the greatest value as having the closest semantic match with the problem embedding vector. The selected embedding vector may be associated with a quantum computing-related problem and/or a classical computing-related problem.

Figure 1F:
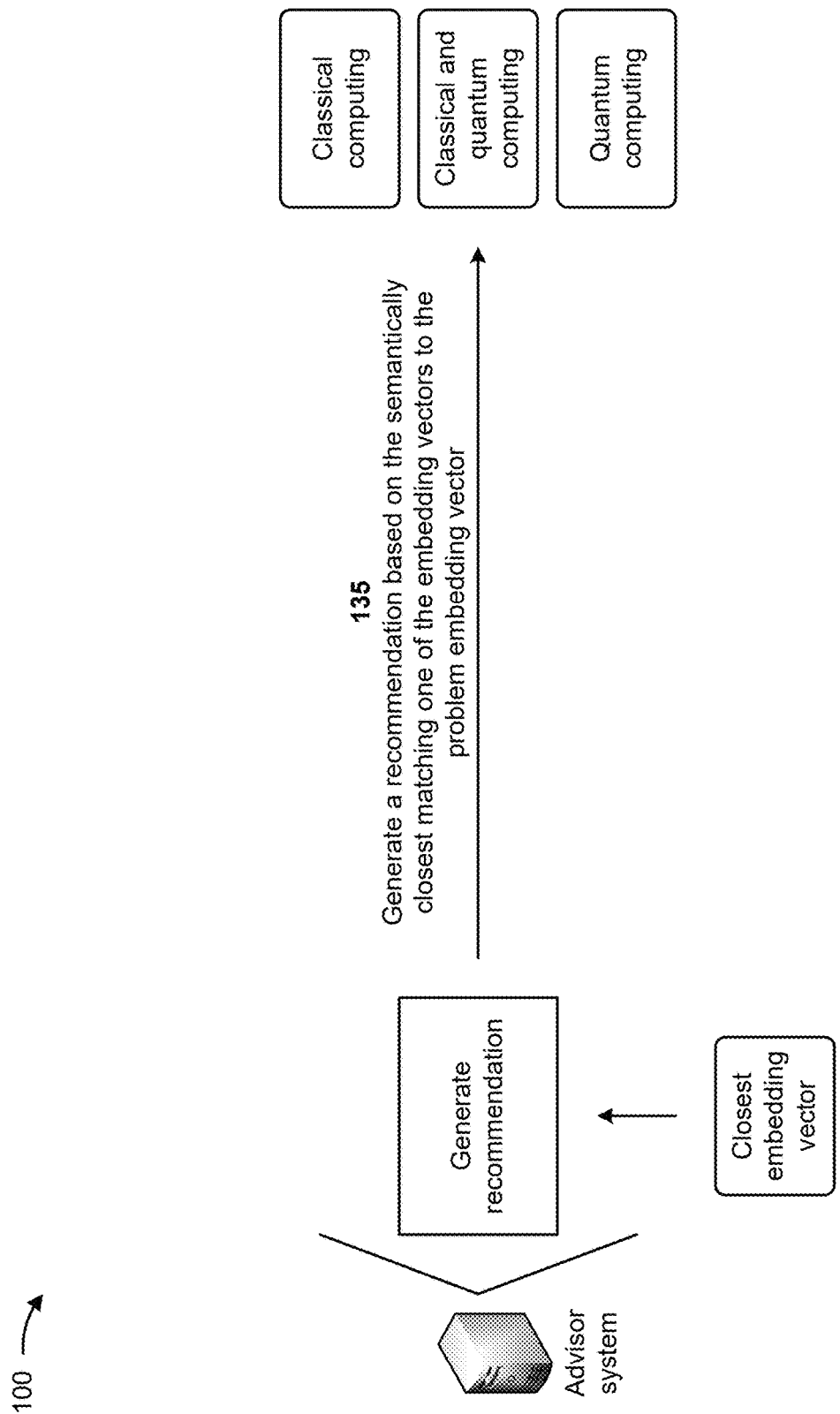

Turning to FIG. 1F, and reference number 135, the advisor system may generate a recommendation based on the semantically closest matching one of the embedding vectors to the problem embedding vector. The recommendation may include an indication to solve the problem with a classical computing resource, to solve the problem with a quantum computing resource, or to solve the problem with a combination of a classical computing resource and a quantum computing resource. For example, the advisor system may determine that a classical computing-related problem is associated with the semantically closest matching one of the embedding vectors and therefore generate a recommendation to solve the problem with a classical computing resource. As another example, the advisor system may determine that a quantum computing-related problem is associated with the semantically closest matching one of the embedding vectors and therefore generate a recommendation to solve the problem with a quantum computing resource. In another example the advisor system may determine that a combination classical computing-related and quantum computing-related problem is associated with the semantically closest matching one of the embedding vectors and therefore generate a recommendation to solve the problem with a combination of a classical computing resource and a quantum computing resource.

In some implementations, the advisor system may determine one or more computing resources required for the semantically closest matching one of the embedding vectors and may generate the recommendation based on determining the one or more computing resources. For example, the advisor system may identify one or more computing resources (e.g., classical computing resources and/or quantum computing resources) that are required to solve the problem (e.g., a classical computing-related problem and/or a quantum computing-related problem) associated with semantically closest matching one of the embedding vectors and may generate the recommendation based on the identification.

Figure 1G:
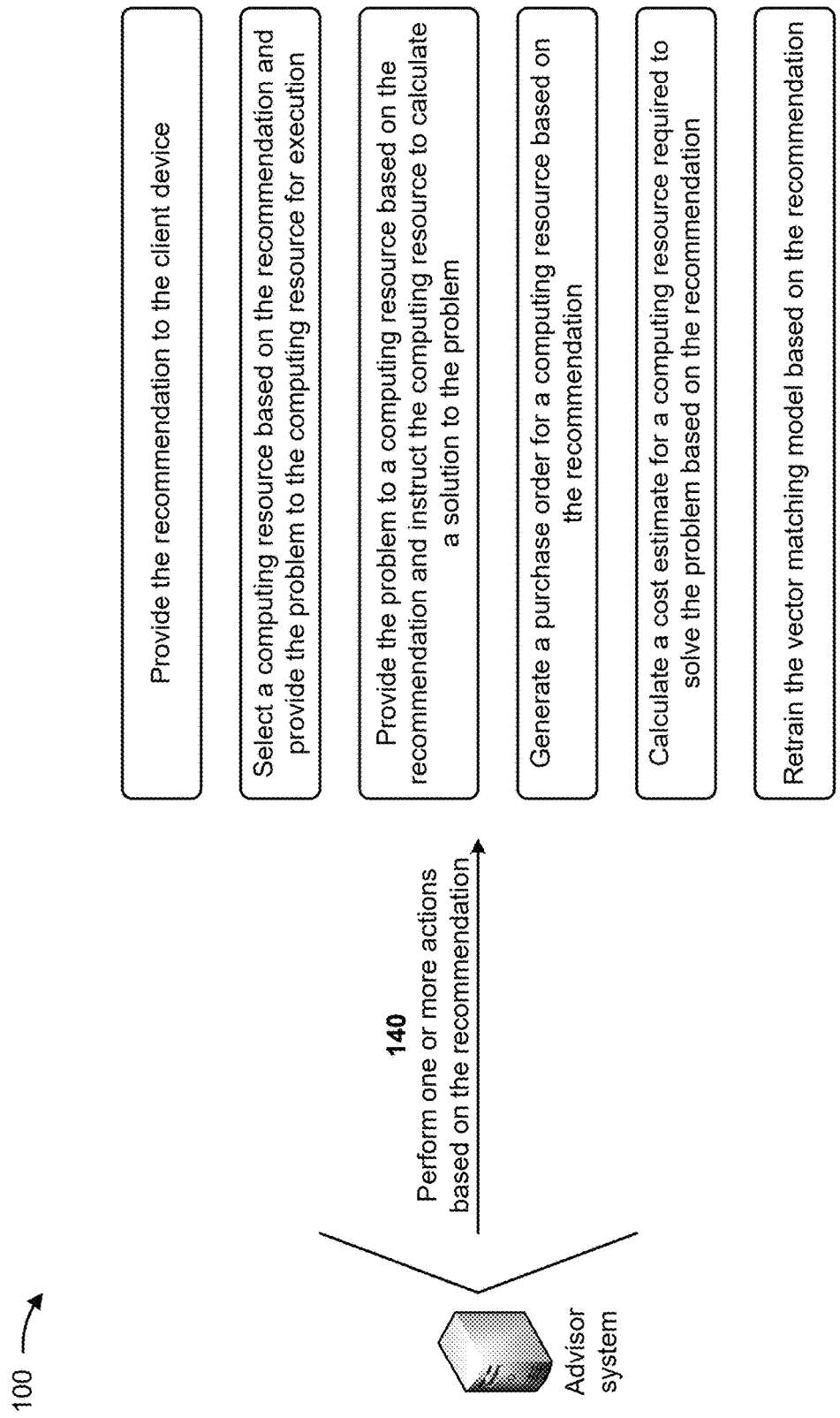

Turning to FIG. 1G, and reference number 140, the advisor system may perform one or more actions (e.g., based on the recommendation). The one or more actions may include providing the recommendation for display to the client device. For example, the advisor system may send the recommendation to the client device (e.g., via the network that connects the advisor system and the client device), which may cause the client device to display the recommendation on a display of the client device. In some implementations, the advisor system may obtain (e.g., from the data source) additional information associated with the problem that is associated with the matching embedding vector and may provide the additional information for display to the client device. The additional data may indicate, for a classic computing-related problem, a run time estimation for solving the problem (e.g., an exponential run time, a polynomial run time, and/or a logarithmic run time, among other examples) and/or a computing resource focus of the problem (e.g., that indicates a type of computing resource that is influential in solving the problem), such as a processor focus (e.g., a significant amount of time is spent performing arithmetic calculations), an input/output focus (e.g., a significant amount of time is spent performing read/write operations associated with an external data structure), and/or a memory focus (e.g., a significant amount of time is spent manipulating data on a local data structure), and/or the like. The additional data may indicate, for a quantum computing-related problem, a run time estimation for solving the problem (e.g., an exponential run time, a polynomial run time, and/or a logarithmic run time, among other examples) and/or a quantum speedup estimation (e.g., that indicates an improvement in runtime of solving the computing-related problem using a quantum computing resource as compared to using a classical computing resource), such as an exponential or slower quantum speedup estimation, a slower than polynomial but faster than exponential quantum speedup estimation, and/or a polynomial or faster quantum speedup estimation, among other examples.

In this way, the advisor system may enable the user of the client device to review and understand the recommendation and additional information, thereby conserving computing resources (e.g, processing resources, memory resources, communication resources, and/or the like), networking resources, and/or the like that would otherwise be wasted in searching, investigating, and/or interpreting materials to determine whether the problem to be solved is better solved via quantum computing or via classical computing.

In some implementations, the one or more actions may include selecting a computing resource (e.g., a classical computing resource and/or a quantum computing resource) based on the recommendation and providing the description of the problem to be solved to the computing resource for execution. Additionally, or alternatively, the one or more actions may include providing the description of the problem to be solved to a computing resource based on the recommendation and instructing the computing resource to calculate a solution to the problem. In this way, the advisor system may automatically cause an optimal computing resource (e.g., a classical computing resource and/or a quantum computing resource) to be used to solve the problem to be solved. In this way, the advisor system may conserve computing resources that would otherwise be used to assess whether the problem is more suitably solved via quantum computing or via classical computing. Further, the advisor system conserves computing resources associated with an incorrect or suboptimal computing technique (e.g., a classical computing technique or a quantum computing technique) that would otherwise be used to attempt to solve the problem to be solved.

In some implementations, the one or more actions may include generating a purchase order for a computing resource based on the recommendation and/or calculating a cost estimate for a computing resource required to solve the problem based on the recommendation. In this way, the advisor system automatically facilitates purchase of a necessary computing resource for solving the problem to be solved and may conserve computing resources (e.g., processing resources, memory resources, communication resources, and/or power resources, among other examples) that would otherwise be used to generate a purchase order or to calculate a cost estimate for the computing resource.

In some implementations, the advisor system may receive feedback from the client device (e.g., that was input into the client device by the user of the client device after the recommendation was displayed on the client device). The feedback may indicate whether the user agrees with the recommendation. Accordingly, the advisor system may update the vector matching model based on the feedback. In this way, the advisor system may improve the accuracy of the vector matching model, which may improve a speed and/or an efficiency of the vector matching model, which conserves computing resources of the advisor system.

In this way, the advisor system utilizes natural language processing similarity matching to determine whether a problem requires quantum computing or classical computing. The advisor system may begin at a particular level of applications to solve a problem and may gradually guide a user to a level where a quantum computing versus classical computing decision may be determined. In this way, the advisor system enables the user to make an informed decision about whether to solve a problem via quantum computing or via classical computing. This, in turn, conserves computing resources, networking resources, human resources, and/or the like that would otherwise have been wasted in incorrectly determining that the problem is more suitably solved via quantum computing or via classical computing, utilizing expensive quantum computing for a problem that may be solved via cheaper classical computing, being unable to solve a problem with classical computing, and/or the like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
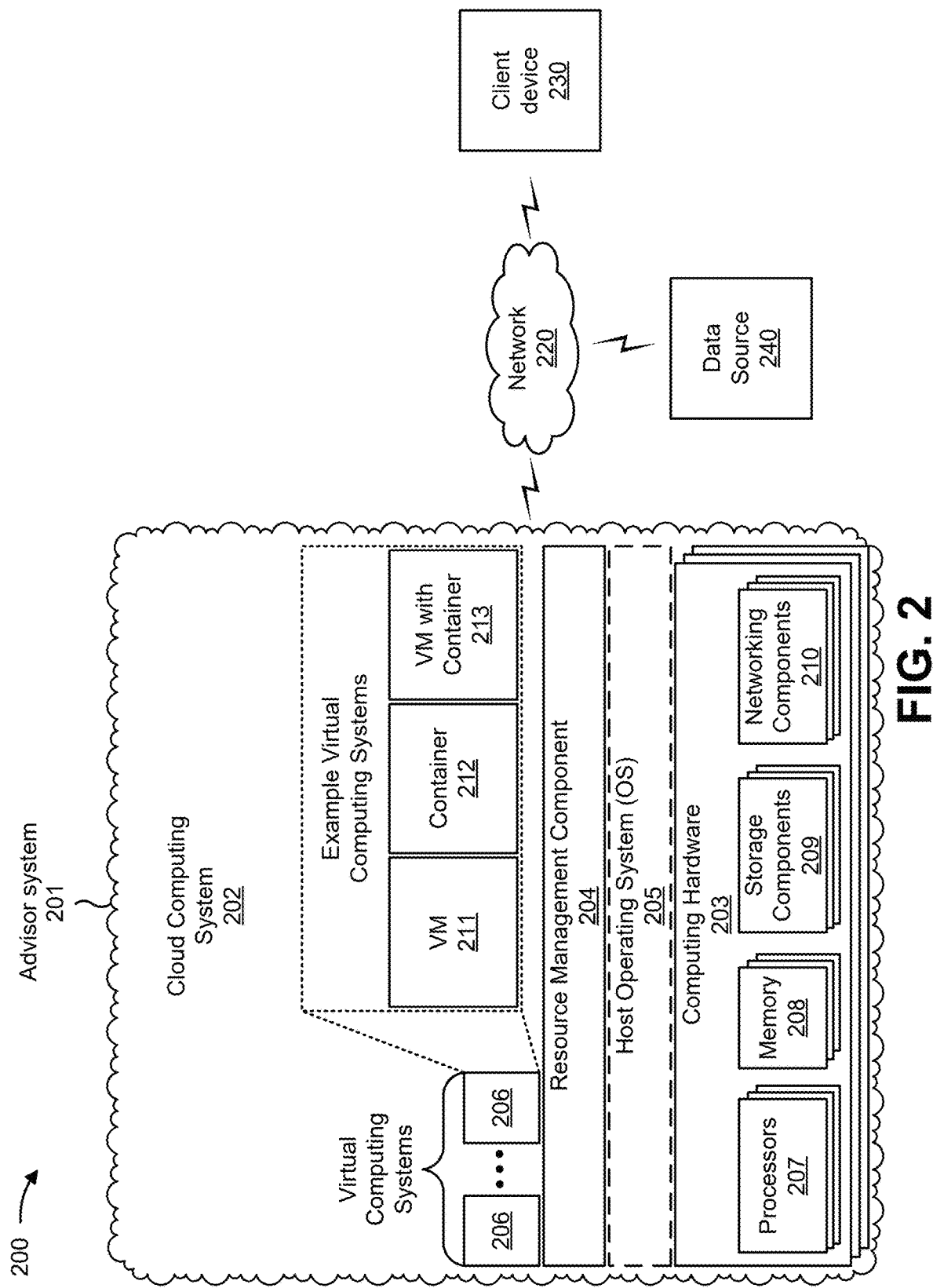
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include an advisor system 201, which may include one or more elements of and/or may execute within a cloud computing system 202. The cloud computing system 202 may include one or more elements 203-213, as described in more detail below. As further shown in FIG. 2, environment 200 may include a network 220, a client device 230, and/or a data source 240. Devices and/or elements of environment 200 may interconnect via wired connections and/or wireless connections.

The cloud computing system 202 includes computing hardware 203, a resource management component 204, a host operating system (OS) 205, and/or one or more virtual computing systems 206. The resource management component 204 may perform virtualization (e.g., abstraction) of computing hardware 203 to create the one or more virtual computing systems 206. Using virtualization, the resource management component 204 enables a single computing device (e.g., a computer, a server, and/or the like) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, and/or the like) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, a hybrid environment 213 that includes a virtual machine and a container, and/or the like. A virtual computing system 206 may execute one or more applications using a file system that includes binary files, software libraries, and/or other resources required to execute applications on a guest operating system (e.g., within the virtual computing system 206) or the host operating system 205.

Although the advisor system 201 may include one or more elements 203-213 of the cloud computing system 202, may execute within the cloud computing system 202, and/or may be hosted within the cloud computing system 202, in some implementations, the advisor system 201 may not be cloud-based (e.g., may be implemented outside of a cloud computing system) or may be partially cloud-based. For example, the advisor system 201 may include one or more devices that are not part of the cloud computing system 202, such as device 300 of FIG. 3, which may include a stand-alone server or another type of computing device. The advisor system 201 may perform one or more operations and/or processes described in more detail elsewhere herein.

Network 220 includes one or more wired and/or wireless networks. For example, network 220 may include a cellular network, a public land mobile network (PLMN), a local area network (LAN), a wide area network (WAN), a private network, the Internet, and/or the like, and/or a combination of these or other types of networks. The network 220 enables communication among the devices of environment 200.

The client device 230 includes one or more devices capable of receiving, generating, storing, processing, and/or providing information associated with providing, to advisor system 201, a description of a problem to be solved with a computing resource, as described elsewhere herein. The client device 230 may include a communication device and/or a computing device. For example, the client device 230 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The data source 240 includes one or more devices capable of receiving, generating, storing, processing, and/or providing information associated with providing, to advisor system 201, problem data identifying quantum computing-related and classical computing-related problems, as described elsewhere herein. The data source 240 may include a communication device and/or a computing device. For example, the data source 240 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data source 240 may communicate with one or more other devices of environment 200, as described elsewhere herein.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
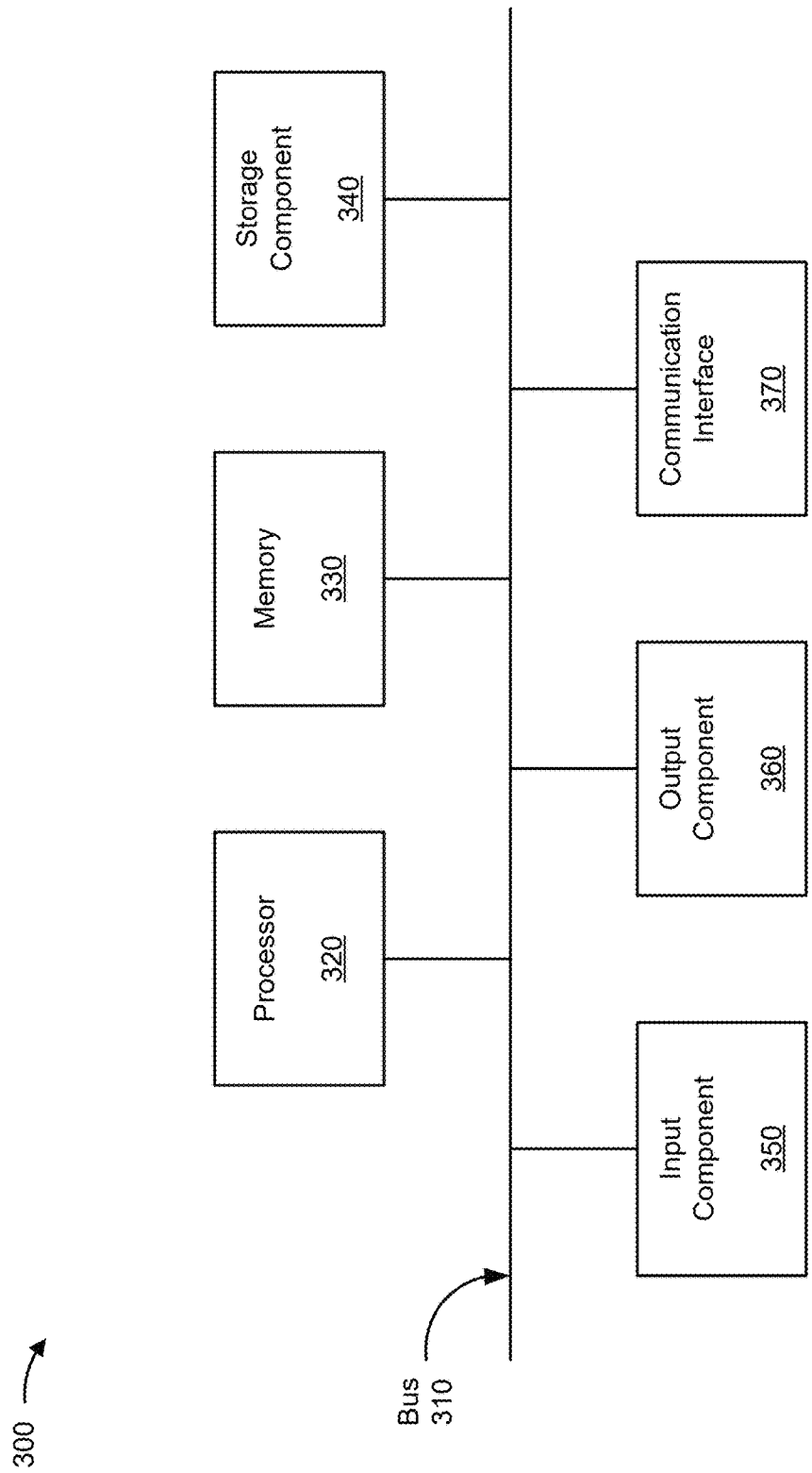
FIG. 3 is a diagram of example components of one or more devices of FIG. 2.

FIG. 3 is a diagram of example components of a device 300, which may correspond to advisor system 201, computing hardware 203, client device 230, and/or data source 240. In some implementations, advisor system 201, computing hardware 203, client device 230, and/or data source 240 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
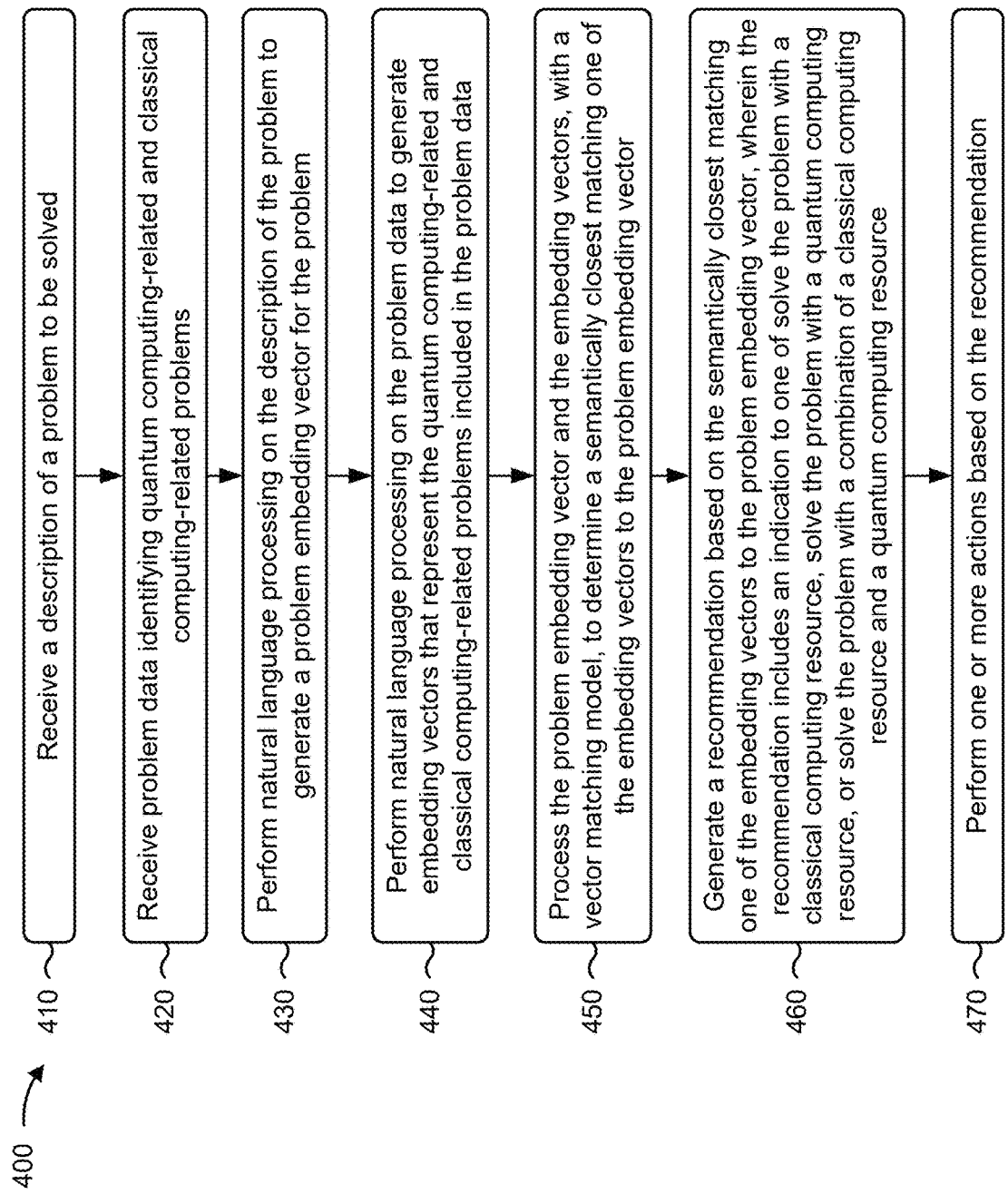
FIG. 4 is a flowchart of an example process for utilizing natural language processing similarity matching to determine whether a problem requires quantum computing or classical computing.

FIG. 4 is a flowchart of an example process 400 associated with utilizing natural language processing similarity matching to determine whether a problem requires quantum computing or classical computing. In some implementations, one or more process blocks of FIG. 4 may be performed by a device (e.g., advisor system 201). In some implementations, one or more process blocks of FIG. 4 may be performed by another device or a group of devices separate from or including the device, such as a client device (e.g., client device 230) and/or a data source (e.g., data source 240). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving a description of a problem to be solved (block 410). For example, the device may receive a description of a problem to be solved, as described above. In some implementations, receiving the description of the problem to be solved with the computing resource comprises providing, to a client device, one or more questions associated with the problem, receiving, from the client device, one or more answers to the one or more questions, and determining the description of the problem based on the one or more answers.

As further shown in FIG. 4, process 400 may include receiving problem data identifying quantum computing-related and classical computing-related problems (block 420). For example, the device may receive problem data identifying quantum computing-related and classical computing-related problems, as described above.

As further shown in FIG. 4, process 400 may include performing natural language processing on the description of the problem to generate a problem embedding vector for the problem (block 430). For example, the device may perform natural language processing on the description of the problem to generate a problem embedding vector for the problem, as described above. The problem embedding vector may include a neural text embedding vector.

In some implementations, performing the natural language processing on the description of the problem to generate the problem embedding vector comprises extracting terms from the description of the problem, determining term embeddings for the terms, applying weights to the term embeddings to generate weighted term embeddings, and calculating an average of the weighted term embeddings as the problem embedding vector. In some implementations, performing the natural language processing on the description of the problem to generate the problem embedding vector comprises converting the description of the problem into a machine-readable text, splitting the machine-readable text into an array of words, splitting the array of words into sequences of contiguous words, and calculating word scores for the sequences of contiguous words to generate the problem embedding vector.

As further shown in FIG. 4, process 400 may include performing natural language processing on the problem data to generate embedding vectors that represent the quantum computing-related and classical computing-related problems included in the problem data (block 440). For example, the device may perform natural language processing on the problem data to generate embedding vectors that represent the quantum computing-related and classical computing-related problems included in the problem data, as described above.

In some implementations, performing the natural language processing on the problem data to generate the embedding vectors comprises extracting terms from the problem data, determining term embeddings for the terms, applying weights to the term embeddings to generate weighted term embeddings, and calculating averages of the weighted term embeddings as the embedding vectors. In some implementations, performing the natural language processing on the problem data to generate the embedding vectors comprises converting the problem data into a machine-readable text, splitting the machine-readable text into an array of words, splitting the array of words into sequences of contiguous words, and calculating word scores for the sequences of contiguous words to generate the embedding vectors.

As further shown in FIG. 4, process 400 may include processing the problem embedding vector and the embedding vectors, with a vector matching model, to determine a semantically closest matching one of the embedding vectors to the problem embedding vector (block 450). For example, the device may process the problem embedding vector and the embedding vectors, with a vector matching model, to determine a semantically closest matching one of the embedding vectors to the problem embedding vector, as described above. Each of the embedding vectors may include a neural text embedding vector. The vector matching model may include a cosine similarity model.

As further shown in FIG. 4, process 400 may include generating a recommendation based on the semantically closest matching one of the embedding vectors to the problem embedding vector (block 460). For example, the device may generate a recommendation based on the semantically closest matching one of the embedding vectors to the problem embedding vector, as described above. In some implementations, the recommendation includes an indication to solve the problem with a classical computing resource, solve the problem with a quantum computing resource, or solve the problem with a combination of a classical computing resource and a quantum computing resource.

In some implementations, generating the recommendation based on the semantically closest matching one of the embedding vectors to the problem embedding vector comprises determining one or more computing resources required for the semantically closest matching one of the embedding vectors, and generating the recommendation based on determining the one or more computing resources.

As further shown in FIG. 4, process 400 may include performing one or more actions based on the recommendation (block 470). For example, the device may perform one or more actions based on the recommendation, as described above.

In some implementations, performing the one or more actions includes providing the recommendation for display to the client device, selecting a computing resource based on the recommendation and provide the description of the problem to the computing resource for execution, providing the description of the problem to a computing resource based on the recommendation and instructing the computing resource to calculate a solution to the problem, generating a purchase order for a computing resource based on the recommendation, calculating a cost estimate for a computing resource required to solve the problem based on the recommendation, and/or retraining the vector matching model based on the recommendation.

In some implementations, performing the one or more actions includes providing the recommendation to the client device, receiving feedback on the recommendation from the client device, and updating the vector matching model based on the feedback. In some implementations, performing the one or more actions includes providing, based on the recommendation, the description of the problem to one of the classical computing resource, the quantum computing resource, or the combination of the classical computing resource and the quantum computing resource, and causing the one of the classical computing resource, the quantum computing resource, or the combination of the classical computing resource and the quantum computing resource to solve the problem.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method comprising:
   receiving, by a device, a description of a problem to be solved from a client device;
   receiving, by the device, problem data from a data source different from the client device, wherein the problem data includes previously identified quantum computing-related and classical computing-related problems;
   performing, by the device, natural language processing on the description of the problem to generate a problem embedding vector for the problem;
   performing, by the device, natural language processing on the problem data to generate embedding vectors that represent the quantum computing-related and classical computing-related problems included in the problem data;
   processing, by the device, the problem embedding vector and the embedding vectors, with a vector matching model, to determine a semantically closest matching one of the embedding vectors to the problem embedding vector;
   generating, by the device, a recommendation based on the semantically closest matching one of the embedding vectors to the problem embedding vector, wherein the recommendation includes an indication to one of:
   solve the problem with a classical computing resource,
   solve the problem with a quantum computing resource, or
   solve the problem with a combination of the classical computing resource and the quantum computing resource;
   generating, by the device, additional data related to the recommendation, based on the semantically closest matching,
   wherein the additional data indicates:
   a run time estimation for solving the problem;
   a computing resource indicating a type of computing resource solving the problem, wherein the computing resource includes at least one of an amount of time spent by a processor function, an amount of time spent performing read/write by an input/output function or an amount of time spent in data manipulation by a memory function;
   a quantum speedup estimation indicating an improvement in runtime of solving the problem using the quantum computing resource as compared to the classical computing resource; and
   performing, by the device, one or more actions based on the recommendation and the additional data, wherein the one or more actions include:
   selecting the computing resource based on the recommendation;
   providing the description of the problem to be solved to the selected computing resource based on the recommendation; and
   instructing the computing resource to calculate a solution to the problem.

2. The method of claim 1, wherein receiving the description of the problem to be solved comprises:
   providing, to the client device, one or more questions associated with the problem;
   receiving, from the client device, one or more answers to the one or more questions; and
   determining the description of the problem based on the one or more answers.

3. The method of claim 1, wherein the problem embedding vector and each of the embedding vectors includes a neural text embedding vector.

4. The method of claim 1, wherein performing the natural language processing on the description of the problem to generate the problem embedding vector comprises:
   extracting terms from the description of the problem;
   determining term embeddings for the terms;
   applying weights to the term embeddings to generate weighted term embeddings; and
   calculating an average of the weighted term embeddings as the problem embedding vector.

5. The method of claim 1, wherein performing the natural language processing on the problem data to generate the embedding vectors comprises:
   extracting terms from the problem data;
   determining term embeddings for the terms;
   applying weights to the term embeddings to generate weighted term embeddings; and calculating averages of the weighted term embeddings as the embedding vectors.

6. The method of claim 1, wherein the vector matching model includes a cosine similarity model.

7. The method of claim 1, wherein generating the recommendation based on the semantically closest matching one of the embedding vectors to the problem embedding vector comprises:
  determining one or more computing resources required for the semantically closest matching one of the embedding vectors; and
  generating the recommendation based on determining the one or more computing resources.

8. A device comprising:
  one or more memories; and
  one or more processors, communicatively coupled to the one or more memories, configured to:
    provide, to a client device, one or more questions associated with a problem to be solved;
    receive, from the client device, one or more answers to the one or more questions;
    determine a description of the problem based on the one or more answers;
    receive problem data from a data source different from the client device, wherein the problem data includes previously identified quantum computing-related and classical computing-related problems;
    perform natural language processing on the description of the problem to generate a problem embedding vector for the problem;
    perform natural language processing on the problem data to generate embedding vectors that represent the quantum computing-related and classical computing-related problems included in the problem data;
    process the problem embedding vector and the embedding vectors, with a vector matching model, to determine a semantically closest matching one of the embedding vectors to the problem embedding vector;
    generate a recommendation based on the semantically closest matching one of the embedding vectors to the problem embedding vector, wherein the recommendation includes an indication to one of:
      solve the problem with a classical computing resource,
      solve the problem with a quantum computing resource, or
      solve the problem with a combination of the classical computing resource and the quantum computing resource;
    generate additional data related to the recommendation, based on the semantically closest matching,
      wherein the additional data indicates:
        a run time estimation for solving the problem;
        a computing resource indicating a type of computing resource solving the problem, wherein the computing resource includes at least one of an amount of time spent by a processor function, an amount of time spent performing read/write by an input/output function or an amount of time spent in data manipulation by a memory function;
        a quantum speedup estimation indicating an improvement in runtime of solving the problem using the quantum computing resource as compared to the classical computing resource; and
    perform one or more actions based on the recommendation and the additional data, wherein the one or more actions include:
      selecting the computing resource based on the recommendation;
      providing the description of the problem to be solved to the selected computing resource based on the recommendation; and
      instructing the computing resource to calculate a solution to the problem.

9. The device of claim 8, wherein the one or more processors, when performing the one or more actions, are configured to one or more of:
  provide the recommendation for display to the client device;
  select a computing resource based on the recommendation and provide the description of the problem to the computing resource for execution; or
  provide the description of the problem to the computing resource based on the recommendation and instruct the computing resource to calculate a solution to the problem.

10. The device of claim 8, wherein the one or more processors, when performing the one or more actions, are configured to one or more of:
  generate a purchase order for a computing resource based on the recommendation;
  calculate a cost estimate for the computing resource required to solve the problem based on the recommendation; or
  retrain the vector matching model based on the recommendation.

11. The device of claim 8, wherein the one or more processors, when performing the one or more actions, are configured to:
  provide the recommendation to the client device;
  receive feedback on the recommendation from the client device; and
  update the vector matching model based on the feedback.

12. The device of claim 8, wherein the one or more processors, when performing the one or more actions, are configured to:
  provide, based on the recommendation, the description of the problem to one of the classical computing resource, the quantum computing resource, or the combination of the classical computing resource and the quantum computing resource; and
  cause the one of the classical computing resource, the quantum computing resource, or the combination of the classical computing resource and the quantum computing resource to solve the problem.

13. The device of claim 8, wherein the one or more processors, when performing the natural language processing on the description of the problem to generate the problem embedding vector, are configured to:
  convert the description of the problem into a machine-readable text;
  split the machine-readable text into an array of words;
  split the array of words into sequences of contiguous words; and
  calculate word scores for the sequences of contiguous words to generate the problem embedding vector.

14. The device of claim 8, wherein the one or more processors, when performing the natural language processing on the problem data to generate the embedding vectors, are configured to:

convert the problem data into a machine-readable text;
split the machine-readable text into an array of words;
split the array of words into sequences of contiguous words; and
calculate word scores for the sequences of contiguous words to generate the embedding vectors.

15. A non-transitory computer-readable medium storing a set of instructions, the set of instructions comprising:
one or more instructions that, when executed by one or more processors of a device, cause the device to:
receive a description of a problem to be solved from a client device;
receive problem data from a data source different from the client device, wherein the problem data includes previously identified quantum computing-related and classical computing-related problems;
extract terms from the description of the problem;
determine term embeddings for the terms;
apply weights to the term embeddings to generate weighted term embeddings;
calculate an average of the weighted term embeddings as a problem embedding vector for the problem;
perform natural language processing on the problem data to generate embedding vectors that represent the quantum computing-related and classical computing-related problems included in the problem data;
perform natural language processing on the problem data to generate embedding vectors that represent the quantum computing-related and classical computing-related problems included in the problem data;
process the problem embedding vector and the embedding vectors, with a vector matching model, to determine a semantically closest matching one of the embedding vectors to the problem embedding vector;
generate a recommendation based on the semantically closest matching one of the embedding vectors to the problem embedding vector, wherein the recommendation includes an indication to one of:
solve the problem with a classical computing resource,
solve the problem with a quantum computing resource, or
solve the problem with a combination of the classical computing resource and the quantum computing resource;
generate additional data related to the recommendation, based on the semantically closest matching, wherein the additional data indicates;
a run time estimation for solving the problem;
a computing resource indicating a type of computing resource solving the problem, wherein the computing resource includes at least one of an amount of time spent by a processor function, an amount of time spent performing read/write by an input/output function or an amount of time spent in data manipulation by a memory function;
a quantum speedup estimation indicating an improvement in runtime of solving the problem using the quantum computing resource as compared to the classical computing resource; and
perform one or more actions based on the recommendation and the additional data, wherein the one or more actions include:
selecting the computing resource based on the recommendation;
providing the description of the problem to be solved to the selected computing resource based on the recommendation; and
instructing the computing resource to calculate a solution to the problem.

16. The non-transitory computer-readable medium of claim 15, wherein the one or more instructions, that cause the device to perform the natural language processing on the problem data to generate the embedding vectors, cause the device to:
extract second terms from the problem data;
determine second term embeddings for the second terms;
apply second weights to the second term embeddings to generate second weighted term embeddings; and
calculate averages of the second weighted term embeddings as second embedding vectors.

17. The non-transitory computer-readable medium of claim 15, wherein the one or more instructions, that cause the device to generate the recommendation based on the semantically closest matching one of the embedding vectors to the problem embedding vector, cause the device to:
determine one or more computing resources required for the semantically closest matching one of the embedding vectors; and
generate the recommendation based on determining the one or more computing resources.

18. The non-transitory computer-readable medium of claim 15, wherein the one or more instructions, that cause the device to perform the one or more actions, cause the device to one or more of:
provide the recommendation for display to the client device;
select a computing resource based on the recommendation and provide the description of the problem to the computing resource for execution;
provide the description of the problem to the computing resource based on the recommendation and instruct the computing resource to calculate a solution to the problem;
generate a purchase order for the computing resource based on the recommendation;
calculate a cost estimate for the computing resource required to solve the problem based on the recommendation; or
retrain the vector matching model based on the recommendation.

19. The non-transitory computer-readable medium of claim 15, wherein the one or more instructions, that cause the device to perform the one or more actions, cause the device to:
provide the recommendation to the client device;
receive feedback on the recommendation from the client device; and
update the vector matching model based on the feedback.

20. The non-transitory computer-readable medium of claim 15, wherein the one or more instructions, that cause the device to perform the natural language processing on the problem data to generate the embedding vectors, cause the device to:
convert the problem data into a machine-readable text;
split the machine-readable text into an array of words;
split the array of words into sequences of contiguous words; and
calculate word scores for the sequences of contiguous words to generate the embedding vectors.

* * * * *